United States Patent [19]

Ikelle

[11] Patent Number: 6,094,400
[45] Date of Patent: Jul. 25, 2000

[54] INVERSION METHOD FOR SEISMIC DATA

[75] Inventor: Luc Thomas Ikelle, Milton, United Kingdom

[73] Assignee: Schlumberger Technology Corporation, Ridgefield, Conn.

[21] Appl. No.: 08/821,249

[22] Filed: Mar. 20, 1997

[30] Foreign Application Priority Data

Apr. 15, 1996 [GB] United Kingdom .................. 9607764

[51] Int. Cl.[7] ....................................................... G01V 1/28
[52] U.S. Cl. ................................................ 367/75; 367/31
[58] Field of Search ................................. 367/52, 72, 38, 367/50, 73, 75, 31, 47

[56] References Cited

U.S. PATENT DOCUMENTS

| | | | |
|---|---|---|---|
| 4,766,574 | 8/1988 | Whitmore, Jr. et al. ................. | 367/50 |
| 4,881,209 | 11/1989 | Bloomquist et al. ..................... | 367/52 |
| 5,532,978 | 7/1996 | Corrigan .................................. | 367/75 |
| 5,852,588 | 12/1998 | de Hoop et al. .......................... | 367/38 |

FOREIGN PATENT DOCUMENTS 2293010  3/1996  United Kingdom ............. G01V 1/28

OTHER PUBLICATIONS

A. Tarantola, Linearized Inversion of Seismic Reflection Data, *Geophysical Prospecting 32*, (1984) pp. 998–1015.

Ikelle et al., Linearized Inversion of Multioffset Seismic Reflection Data in the ω–k Domain, *Geophysics*, vol. 51, No. 6 (Jun. 1986), pp. 1266–1276.

Ikelle et al., Linearized Inversion of 3–D Multi–Offset Data: Background Reconstruction and AVO Inversion, *Geophys. J. Int.* No. 123 (1995) pp. 507–528.

T. A. Alkkhalifah et al., Velocity Analysis for Transversely Isotropic Media, 64th Ann. Intern. Mtg., *Soc. Expl. Geophys.* (1994),.

O.Yilmaz, Seismic Data Processing, *Society of Exploration, Geophysists*, 1987, pp. 344–519.

Dellinger et al., Anelliptic Approximations for TI Media, *Journal of Seismic Exploration* No. 2 (1993), pp. 23–40.

A. Canning et al., Feathering Correction for 3–D Marine Data, 62nd Annual Meeting (1992) *Soc. Expl. Geophys.*, Expanded Abstracts, 955–957.

C.L. Nikias and J.M. Mendel, Signal Processing with Higher–Order Spectra, *United Signals & Systems, Inc.*, Massachusetts, 1990.

Ikelle et al (linearized inversion of 3–Dmulti–offset data :background reconstruction and AVO inversion pp. 507–517 May 20, 1995.

Alkhalifah, Tariq. Efficient Synthetic–Seismogram Generation in Transversely Isotropic, Inhomogeneous Media. *Geophysics*, vol. 60, No. 4 (Jul.–Aug. 1995), pp. 1139–1150. 2 Tables.

Thomsen, Leon. Reflection Seismology Over Azimuthally Anisotropic Media, *Geophsyics*, vol. 53, No. 3 (Mar. 1998), pp. 304–313.

Anderson, John, et al. Fowler DMO and Time Migration for Transversely Isotropic Media. *Geophysics*, vol. 61, No. 3 (May–Jun. 1996), pp. 835–845, 6 Figs.

L.T. Ikelle ( Linearized inversion of 3–D multi–offset data :background reconstruction AVO inversion,May 20, 1995; pp. 507–513.

Schoenber et al (introducing annie: a simple three–parameter anisotropic velocity model for shales) Jul. 10, 1995; pp. 35–45.

*Primary Examiner*—Christine K. Oda
*Assistant Examiner*—Anthony Jolly
*Attorney, Agent, or Firm*—William B. Batzer; William L. Wang

[57] ABSTRACT

A method for determining a representation of an anisotropic earth formation is described, wherein the inversion step for generating the representation from recorded seismic data is performed using several values of a pre-defined anisotropy parameter addition to components of the moveout velocity. The anisotropy parameter is preferably introduced into the moveout equation or dispersion relation, which in turn is used in the inversion process. A more accurate representation of earth

10 Claims, 2 Drawing Sheets

INVERSION METHOD FOR SEISMIC DATA

The present invention relates to an inversion or migration method for seismic data. More specifically it relates to such a method as applied to seismic data characterizing anisotropic media.

BACKGROUND AND OBJECT OF THE INVENTION

It is well recognized that most rock formations in the Earth are to some extent anisotropic. For the most part, the anisotropy has been ignored in seismic processing. Its effects are small when compared to assumptions such as plane-layer approximation imposed by NMO and stack processing or the 2D earth model approximation imposed by 2D processing. However, with recent advances in inverse problem theory and supercomputing technology, most of these approximations have been overcome, leading to the development of 3D prestack imaging and inversion. Recent studies suggest that the type of details and accuracy expected from 3D prestack imaging and inversion can be distorted by neglecting anisotropy.

To include anisotropy in 3D prestack imaging and inversion, we need an accurate estimation of the anisotropic background velocity. The reconstruction of anisotropic background velocity models is probably the most important challenge in processing with anisotropy. Conventional methods for reconstructing the background velocity model, like migration-velocity methods, often assume an isotropic subsurface and can yield to inaccurate reservoir descriptions when the subsurface contains anisotropic rock formations.

The known migration-velocity method consists of scanning over different velocity models using prestack migration, the "good" velocity model is then constructed based on focusing analysis. Further details of this method are described for example by O. Yilmaz, Seismic Data Processing, Society of Exploration Geophysists, 1987.

An inversion method for data in the space-time (x-t) domain has for example been described by A. Tarantola in: Geophysical Prospecting, No. 32 (1984), 998–1015).

Another inversion process for data in the wavenumber-frequency ($\omega$-k) domain has for example been described by L. Ikelle et al. in: Geophysics, Vol. 51, No. 6 (June 1986), 1266–1276.

An inversion method for isotropic media, also including a background velocity reconstruction, is described by L. Ikelle in: Geophys.J.Int., No. 123(1995), 507–528.

An attempt to reconstruct a velocity model for a transversely isotropic medium is described by T. A. Alkhalifah and I. Tsvankin in: 64th Ann. Intern. Mtg., Soc. Expl. Geophys. (1994), Expanded Abstracts, 1000–1003.

One reason why the isotropic linearized inversion or migration in the ($\omega$-k) domain are widely used through the industry for reconstructing background velocity models is that the dispersion relationship which controls the extrapolation operation is explicit. This aspect has been extensively exploited over the last two decades to produce efficient migration and linearized inversion algorithms in the ($\omega$-k) domain. For anisotropic media, the dispersion relationship is no longer explicit, it requires numerical resolution of an eigenvalue-eigenvector system for each point in the ($\omega$-k) domain. Such computation is very slow. It renders inversion and migration, therefore anisotropic background reconstruction, economically unattractive.

In view of the above cited prior art it is an object of the invention to improve the known inversion methods for seismic data such as to include anisotropy in the subsurface formation.

SUMMARY OF THE INVENTION

The above-mentioned objects are achieved by methods as set forth in the appended claims.

An important feature of the invention is that the inversion step for generating the representation from recorded seismic data is performed using several values of a pre-defined anisotropy parameter addition to components of the moveout velocity. The anisotropy parameter is preferably introduced into a moveout equation or dispersion relation, which in turn is used in the inversion process.

The term inversion is defined as migration methods for seismic data, in particular any form of velocity analysis of such data. The data are assumed to cover the surveyed formation in more than one direction on the surface (3-D survey), preferably in the form of multi-offset and multi-azimuth data.

A preferred pre-conditioning step includes the removal of direct waves and multiple reflections from the data. However a method in accordance with the invention is best applied to prestack data, i.e., before the single recorded traces are added or otherwise combined.

The invention can be described as generalizing the migration-velocity concept in two aspects: (i) the migration is replaced by multi-parameter linearized inversion for common azimuthal sections and (ii) the background velocity can be anisotropic in its elastic behavior. The combination of both improvements leads to a new scanning procedure for reconstructing anisotropic background media.

It is regarded as a further important feature of the anisotropic or anelliptic parameter, which are preferably introduced into the dispersion or moveout equations, are dimensionless. Dimensionless is defined for the scope of the present invention as having the nature of a pure number, with a value independent from the choice of units.

These and other features of the invention, preferred embodiments and variants thereof, and advantages will become appreciated and understood be those skilled in the art from the detailed description and drawings following hereinbelow.

MODE(S) FOR CARRYING OUT THE INVENTION

Figure 1A:
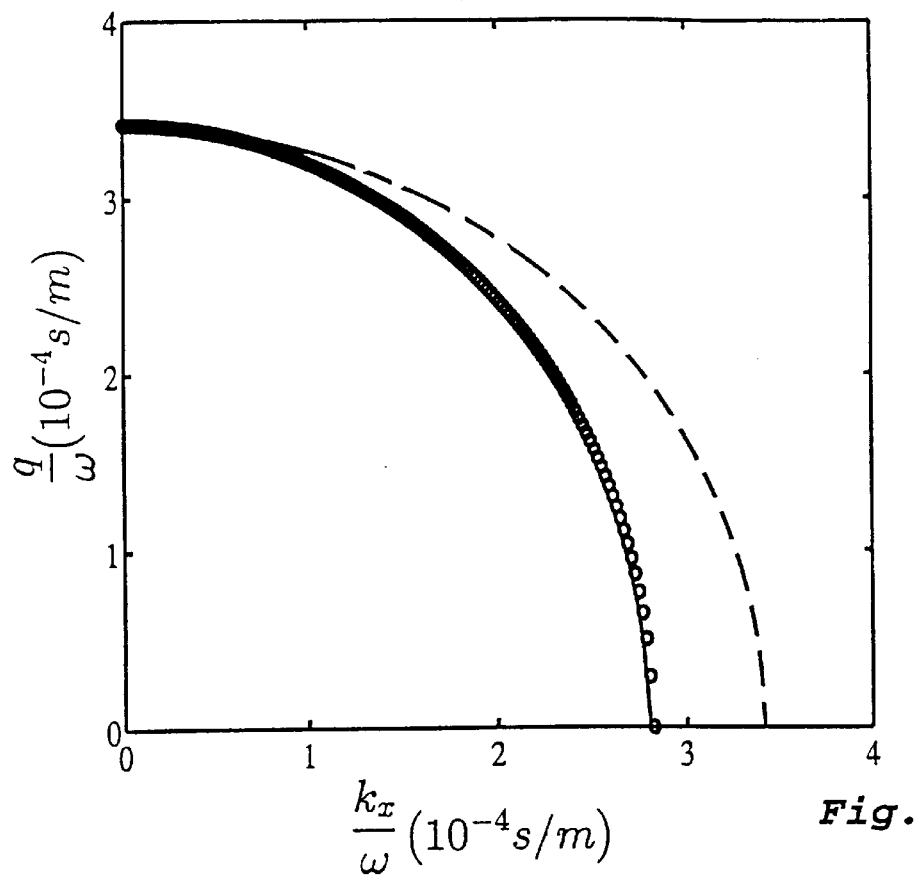
FIGS. 1A, 1B show a dispersion relationship in accordance with an example of the invention in two directions.

The detailed description of an example in accordance with the invention, following hereinbelow, refers firstly to a method of deriving an anisotropic dispersion relationship which can be used in a linearized inversion or migration process. Secondly, an example of reconstructing the background or strata velocity model is described based on the anisotropic dispersion relation.

Although most rocks in the Earth are anisotropic, fortunately they are weakly anisotropic. Explicit formulae of the dispersion relationship even in anisotropic media can thus be derived by using the perturbation techniques with the isotropic component of the medium as the unperturbed medium. The perturbation method consists of expanding the eigenvalue-eigenvector system into perturbation series and keeping only the leading terms, preferably the first two. The first term corresponds to the isotropic solution which is well known. The second terms represents a first order perturbation from the isotropic solution. In the following an explicit representation of this second term is presented.

If $k_1$, $k_2$ are the horizontal wavenumbers corresponding to x and y directions, respectively, and if $\omega$ is the angular frequency corresponding to time t, the relationship between the vertical wavenumber, denoted q(z) and the angular frequency $\omega$ is called the dispersion relation. In the isotropic case for example, the dispersion relationship for P-wave is $$q_0(z) = \frac{\omega}{v_p(z)}\sqrt{1 - \frac{v_p^2(z)[k_1^2 + k_2^2]}{\omega^2}}. \quad [1]$$

Herein $q_0(z)$ denotes the vertical wavenumber in the isotropic media; q(z) is the reserved symbol for the vertical wavenumber in the weakly anisotropic media. This convention is followed through this description. The vertical wavenumber $q_0(z)$ is dependent of $\omega$, $k_1$, $k_2$ and z; this holds also for q(z).

The vertical wavenumber q(z) is a solution of an eigenvalue-problem for which an analytic solution, $q_0(z)$, is known if the medium is isotropic. In the weak anisotropic case, q(z) deviates slightly from its underlying isotropic counterpart $q_0(z)$. So, by using the perturbation technique, we can determine the vertical wavenumber q(z) in the form $$q(z) = \sqrt{[q_0(z)]^2 + 2q_0(z)\delta q(z)}, \quad [2]$$

where $\delta q(z)$ is the first order correction to $q_0(z)$. As there is no unique way of determining $\delta q(z)$, the present example seeks a solution which provide the right trade-off between the level of accuracy and the algorithmic efficiency. The asymptotic expansion is used to develop q(z) as an asymptotic series in the density normalized stiffness tensor, a{ijpq}. Thus, $\delta q(z)$ can be obtained as a linear combination of $\Delta a\{ijpq\}$.

Another important form of the dispersion relationship consists of expressing the frequency $\omega$ in terms of q, $k_1$ and $k_2$. It is useful in migration and inversion with constant velocity. The frequency $\omega$ is decomposed into $$\omega = \omega_0 + \delta\omega, \quad [3]$$

where $\omega_0$ is the frequency associated with the oscillations in the isotropic component of the weakly anisotropic media and $\delta\omega$ is the first order correction to $\omega_0$ due to the anisotropic component of the weakly anisotropic medium. The frequency $\omega_0$ can be determined in terms of $q_0$, $k_1$ and $k_2$ directly from equation [1]. To determine $\delta\omega$, the phase slowness has to be corrected as well. Let the unperturbed phase slowness be $\gamma_0$ and the actual phase slowness be $\gamma = \gamma_0 + \delta\gamma$ at a given wavenumber $q_0$. Then $$q_0 = \omega_0\gamma_0 = (\omega_0 + \delta\omega)(\gamma_0 + \delta\gamma) \quad [4]$$

which leads to the following relationship between the slowness and frequency perturbations at a given wavenumber $$\omega = \omega_0\left[1 - \frac{\delta\gamma}{\gamma_0}\right] \quad [5]$$

or equivalently to $$\omega = \omega_0\left[1 - \frac{\delta q}{q_0}\right] \quad [6]$$

So far $\delta q$ can be the perturbation of the vertical wavenumber of qS-waves or qp-waves. For the remainder of this description, the example focuses on qp-waves only. However, an analysis similar to that described below for qP-waves can be carried out for qS-waves by using the qS-wave expression of $\delta q$.

It should be also noted that the approximation (6) to the dispersion relationship is different from those proposed by Dellinger et al. in: J. of Seismic Explor., No. 2(1993), 23–40. Contrary to those approximations, the approximation of eq. [6] is not restricted to transversely isotropic (TI) media and more importantly it can be used for prestack F-K migration.

The vertical wavenumber q(z) for a transversely isotropic media can be written in the following form $$q(z) = \frac{\omega}{V_v}\sqrt{1 - \frac{V_{NMO}^2[k_1^2 + k_2^2]}{\omega^2} - \eta\frac{V_{NMO}^4[k_1^2 + k_2^2]^2}{\omega^4}} \quad [7]$$

When $\eta = 0$ equation [7] can be written in elliptical form:

$$\left[\frac{V_v q}{\omega}\right]^2 + \left[\frac{V_{NMO} k}{\omega}\right]^2 = 1 \quad [8]$$

Therefore $\eta$ is the anelliptic or anisotropy parameter in the equation [7]. The ellipticity of this equation is described by the normal moveout velocity $V_{NMO}$ and the vertical velocity $V_v$. The anisotropy parameter, the normal moveout velocity and the vertical velocity are important parameters in the scanning procedure for reconstructing anisotropic background velocity models as is described below. As for the following description, the term "anelliptic" and "anisotropic" both denote directional dependency of physical properties of an earth formation. Thus, a relation between the anisotropy or anelliptic parameters and the elastic coefficients of the stiffness tensor exists.

In the following the dispersion relationship, through the vertical wavenumber q(z), for an azimuthally anisotropic media is derived. In the present example, an orthorhombic medium is considered. The orthorhombic case is a standard type of anisotropy and it is often encountered in the Earth exploration. The dispersion relation is $$q(z) = \frac{\omega}{V_v} \times$$

$$\left[1 - \frac{V_{x,NMO}^2 k^2}{\omega^2} - \frac{V_{y,NMO}^2 k^2}{\omega^2} - 2\frac{V_v^4 k_1^2 k_2^2}{\omega^4}\rho_4 - \frac{V_v^4 k_1^4}{\omega^4}\rho_5 - \frac{V_v^4 k_2^4}{\omega^4}\rho_6\right]^{1/2} \quad [9]$$

If the anisotropy parameters $\rho_i$ (i=4,5,6) all equal 0, equation [9] describes an ellipsoid. It becomes:

$$\left[\frac{V_v q}{\omega}\right]^2 + \left[\frac{V_{x,NMO} k_1}{\omega}\right]^2 + \left[\frac{V_{y,NMO} k_2}{\omega}\right]^2 = 1. \quad [10]$$

So, the anellipticity in the orthorhombic media is described by the three parameters $\rho_i$. The ellipsoidal behavior is described by a vertical velocity $V_v$ and two elliptical normal moveout velocities $V_x$ and $V_y$. These parameters will be used in the scanning procedure described below.

It is important to notice that the above definition of the anisotropy parameters is not unique. An alternative definition is for example given by multiplying each parameter as defined in eq. [9] by factors of $f(V_{NMO}/V_v)$, where f is an arbitrary function of the argument. This redefinition or scaling would effectively eliminate the vertical velocity from eq. [9].

Figure 1B:
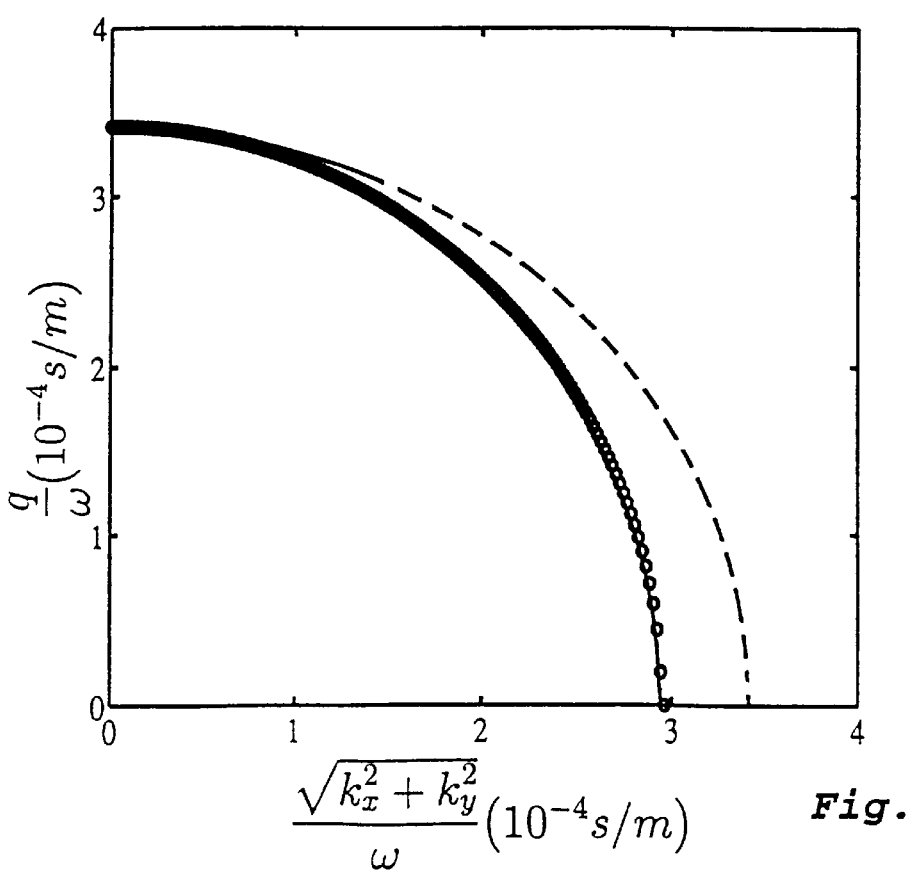
Figure 2:
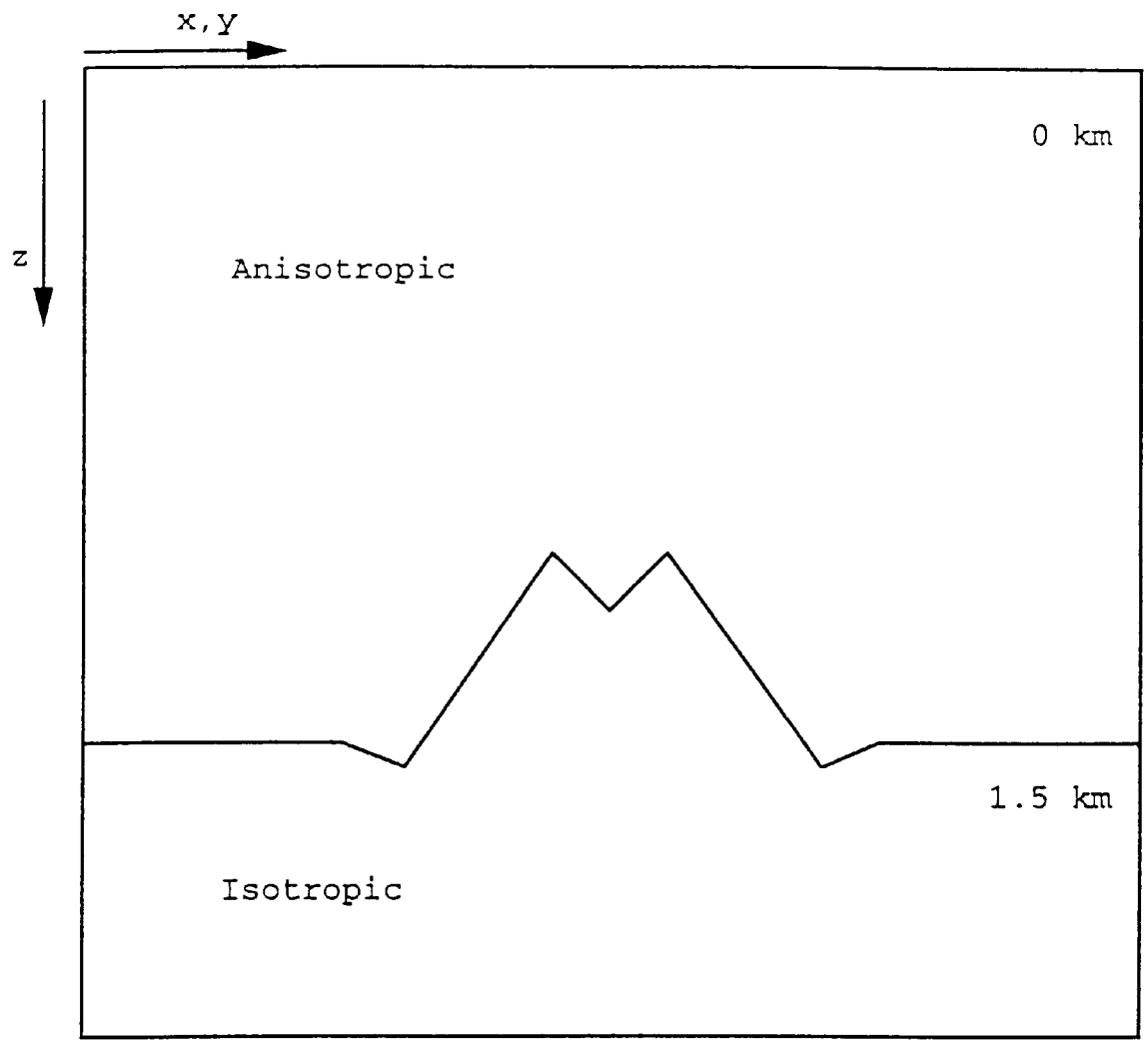
FIG. 2 shows an anisotropic earth model.

The validity of the dispersion relation given by equation [9] is demonstrated by FIGS. 1A and 1B, which show the vertical wavenumber as predicted by eq. [9], denoted by open circles, in comparison with laboratory measurement (solid line) and the isotropic approximation given by eq. [10] (dashed line) in two perpendicular direction of the k space $(k_x, k_y)$.

Another form of q(z) can be defined by a transformation into polar co-ordinates, i.e., writing q(z) as function of dip angle $\theta$ and azimuthal angle $\phi$. This can be done by changing the wavenumbers $k_1$ and $k_2$ by the dip and azimuth angles:

$$k_1 = \frac{\omega}{V_v}\sin\theta\cos\phi, \qquad [11]$$

$$k_2 = \frac{\omega}{V_v}\sin\theta\sin\phi. \qquad [12]$$

With these new variables, the vertical wavenumber (equation [9]) can be written as a Fourier series in $\phi$:

$$q^2(z) = \frac{\omega^2}{V_v^2}[\zeta_0(\theta) + \zeta_1(\theta)\cos(2\phi) + \zeta_2(\theta)\cos(4\phi)], \qquad [13]$$

where $$\zeta_0(\theta) = 1 - \frac{1}{2V_v^2}(V_{x,NMO}^2 + V_{y,NMO}^2)\sin^2\theta -$$
$$\frac{1}{8}(2\rho_4 + 3\rho_5 + 3\rho_6)\sin^4\theta$$

$$\zeta_1(\theta) = -\frac{1}{2V_v^2}(V_{x,NMO}^2 - V_{y,NMO}^2)\sin^2\theta - \frac{1}{2}(\rho_5 - \rho_6)\sin^4\theta \qquad [14]$$

$$\zeta_2(\theta) = \frac{1}{8}(2\rho_4 - \rho_5 - \rho_6)\sin^4\theta$$

Equations [14] show that the orthorhombic vertical wavenumber can be described by three functions which are independent of azimuth $\phi$. The first part $\zeta_0(\theta)$ represents an equivalent TI medium.

Using equations [13,14] it is possible to reconstruct the orthorhombic anisotropy by using three different azimuths. This is exploited in the scanning procedure for three specific values of azimuth $\phi=0$, $\pi/4$, and $\pi/2$:

$$q^2(z) = \frac{\omega^2}{V_v^2}\left[1 - \frac{V_{x,NMO}^2}{V_v^2}\sin^2\theta - \rho_5\sin^4\theta\right], \qquad [15]$$

$$= \frac{\omega^2}{V_v^2}\left[1 - \frac{V_{x,NMO}^2}{\omega^2}k^2 - \frac{V_v^4}{\omega^4}\rho_5 k^4\right]$$

if $\phi = 0$, and $$q^2(z) = \frac{\omega^2}{V_v^2}\left[1 - \frac{V_{x,NMO}^2 + V_{y,NMO}^2}{2V_v^2}\sin^2\theta - \frac{1}{4}(2\rho_4 + \rho_5 + \rho_6)\sin^4\theta\right] \qquad [16]$$

$$= \frac{\omega^2}{V_v^2}\left[1 - \frac{V_{x,NMO}^2 + V_{y,NMO}^2}{\omega^2}k^2 - \frac{1}{4}\frac{V_v^4}{\omega^4}(2\rho_4 + \rho_5 + \rho_6)k^4\right]$$

if $\phi = \pi/4$, and $$q^2(z) = \frac{\omega^2}{V_v^2}\left[1 - \frac{V_{y,NMO}^2}{V_v^2}\sin^2\theta - \rho_6\sin^4\theta\right], \qquad [17]$$

$$= \frac{\omega^2}{V_v^2}\left[1 - \frac{V_{y,NMO}^2}{\omega^2}k^2 - \frac{V_v^4}{\omega^4}\rho_6 k^4\right]$$

if $\phi=\pi/2$, with $$k^2 = k_1^2 k_2^2 \qquad [18]$$

These three expressions of q at three particular values of $\phi$ completely describe the dispersion relationship, through the vertical wavenumber, in orthorhombic media. Furthermore, each of the three expressions describes a TI medium. Therefore, the orthorhombic velocity model can be parameterized by three TI media: For $\phi=0$, the vertical velocity, the normal moveout velocity and the anelliptic parameter of the corresponding TI medium are $V_v$, $V_{x,NMO}$ and $\rho_5$, respectively. For $\phi=\pi/2$, the corresponding TI medium has the same vertical velocity $V_v$ but a different normal moveout, $V_{y,NMO}$ and a different anelliptic parameter $\rho_6$. The anellipticity of the TI medium corresponding to $\phi=\pi/4$ contains the anelliptic parameter $\rho_4$ needed to completely reconstruct the orthorhombic velocity model.

In the following the above derived relations to reconstruct a background velocity model, including a method for selecting or sorting seismic data for such reconstruction, is described.

As the anisotropic background velocity model is generally described by several elastic coefficients or anisotropy parameters, it is important to adopt an efficient scanning procedure, which effectively constrains these coefficients. In this example common azimuthal sections are selected from recorded three-dimensional (3D) seismic data.

The procedure is then repeated for different common azimuthal sections, each new common azimuthal section leads to a new azimuthally isotropic velocity model if the medium is azimuthally anisotropic. The number of common azimuthal sections, and therefore the number of azimuthally isotropic velocity models, needed to reconstruct an azimuthally anisotropic velocity model is dependent on the type of symmetries. For example, only three common azimuthal sections are needed for an orthorhombic medium.

In the following a way of constructing a common azimuthal section from given seismic data is described:

Considering a typical seismic reflection survey, $(x_g, y_g, z_g=0)$ denotes a generic receiver position and $(x_s, y_s, z_s=0)$ denotes a generic "shot" position. A typical seismic reflection data set can be represented by $D(x_g, y_g, t; x_s, y_s)$. The time t is reset to zero at each shot.

Introducing the midpoint co-ordinates $$x=(x_g+x_s)/2$$
$$y=(y_g+y_s)/2 \qquad [19]$$

and half-offset co-ordinates $$h=(x_g-x_s)/2$$
$$h'=(y_g-y_s)/2, \qquad [20]$$

the data $D(x_g, y_g, t; x_s, y_s)$ can equivalently be represented by $D(x, y, t; h, h')$ or its Fourier transformed version $D(k_x, k_y, \omega; k_h, k_h')$. The variables $k_x$, $k_y$, $k_h$, and $k_h'$ are midpoint and half-offset wavenumbers which correspond to x, y, h, and h', respectively.

To facilitate the scanning procedure for the reconstruction of azimuthally anisotropic background, thus, constant azimuthal sections are chosen instead of the full 3D seismic data. This is equivalent to taking one of the half offset co-ordinates, for example h', to be constant. A common azimuthal section can be described as a series of 2D multi-offset profiles all oriented according to a particular azimuth. For further details concerning the general aspects of this method, reference is made to L. Ikelle, Geophys.J.Int., No. 123(1995), 507–528, and A. Canning and G. H. F. Gardner, 62nd Ann. Mtg. (1992), Soc. Expl. Geophys., Expanded Abstracts, 955–957, which describe how a 3D marine seismic acquisition can be transformed into a series of 2D profiles, from which the common azimuthal sections can be extracted. Savings with respect to CPU time and memory are gained from the use of constant azimuthal sections.

In practice, 3D multi-offset data are collected in multi-channels but not as a series of 2D multi-offset profiles. The sorting or organization of 3D multi-channel data into 2D profiles determines how a common azimuthal section must be defined. In this example it is simply assumed that common azimuthal sections are formed by brute stack over the offset in the direction perpendicular to the azimuth. For example, $D(k_x, k_y, \omega; k_h, k_h'=0)$. represents the zero degree azimuthal section.

Alternative organizations from 3D multi-channel data to a series of 2D profiles are known. However the described method of extracting a common azimuthal section from 3D seismic data simplifies the subsequent inversion formulae.

Having selected the appropriate data, it is described in the following how to determine the optimal value for the anisotropy parameters and velocities as defined hereinabove.

For the following steps it is assumed that a solution for the inverse problem, i.e., to determine the field description from the measured seismic data for an isotropic medium exists. Such a method is also described in L. Ikelle, Geophys.J.Int., No. 123(1995), 507–528, make use of the solution of the linearized inversion as known from L. Ikelle et al. Geophysics, Vol. 51, No. 6 (June 1986), 1266–1276, equation (14).

It is important to notice that alternative description for the Earth medium are known, leading to different solution of the inversion problem. For example a solution of the inverse problem in the space-time domain is given by A. Tarantola, Geophysical Prospecting 32(1984), 998–1015, summarized in equations (36).

As all of these known solutions of the inverse problem are complex and use different notations, a reproduction of the relevant formulas in this description is omitted.

However, a common characteristic of the known solutions is that use is made of equations which characterize the movement of the wavefront of the elastic wave in space and time. In the f-k domain these equations are called dispersion relationships, in the space-time domain they are known as "moveout-equations". It is an important aspect of the invention to parameterize those relations, such that at least one dimensionless parameter appears which characterizes the anisotropy of the medium. Examples of such parameters are η and $\rho_i$.

As a result of the parameterization of the dispersion relationship, the background medium is described by several parameters in the anisotropic case. Therefore, for setting up a scanning procedure in the anisotropic case, it is important to scan over parameters that are as independent as possible, in terms of their relationship to travel times of seismic data, or over parameters that can be reconstructed hierarchically based on the significance of their contribution to travel times in seismic data.

For reconstructing an azimuthally isotropic background velocity model (i.e., TI model), in the present example a two scanning step procedure is utilized. As the isotropic component is the dominant part for most anisotropic rock formations in the Earth, the first scan optimizes the normal moveout velocities, $V_{NMO}$, which characterize the travel times variations with offset in isotropic media. This scan is carried out over isotropic background velocity models using linearized inversion in equation [1] with the dispersion relation in equation [4]. Once $V_{NMO}$ is determined, a second scan over the anelliptic parameter η with the TI dispersion relationship of eq. [7] is carried out to adjust for anellipticity. Thus, the reconstruction of a TI velocity model requires two scans instead of one as in the isotropic case. In fact, an isotropic two-parameter linearized inversion, where the inversion of one parameter is essentially based on small offset data and the other parameter is essentially based on large offset data, yields two different velocity models for the part of the data corresponding to anisotropic rock formations. One possible choice is the P-wave impedance and the shear modulus with the appropriate weighting functions as chosen in this example (see above). The normal moveout velocity in this case is extracted from outputs of P-wave impedance.

The optimum value for a given parameter can be determined from the scanning process performed in the above-mentioned steps using the various known criteria, such as Focusing criteria, Coherence criteria described by Yilmaz (see above), which applies to Gaussian distributed data, or Bicoherence criteria, as known for example from C. L. Nikias and J. M. Mendel, "Signal Processing with Higher-Order Spectral", United Signals & Systems, Inc., Massachusetts, 1990. Though the latter method gives probably the best results, in the present example the simple amplitude criteria is used, which selects the data according to their amplitude.

Notice that the knowledge of vertical velocity $V_v$ is not required in this scanning procedure because the variations of vertical velocity do not affect the travel time variations with offset or azimuths; in other words, it acts as a scaling factor in time processing. However, the vertical velocity is crucial for depth conversion. Fortunately, it is often known from vertical seismic profiles (VSP) or check-shot data.

Having described above the process to optimize the parameter and velocity for a transversely isotropic medium, in the following the process of determining the optimal values for the parameters in case of an azimuthally anisotropic medium is described.

It has been shown that the dispersion relationship of zimuthally anisotropic media can be decomposed into TI dispersion relationships (cf. equations [15]–[17] for the orthorhombic case. Therefore it is possible to reconstruct the azimuthally anisotropic velocity model as a group of TI velocity models.

Hence, an advantageous method for deriving the velocity model is to treat the problem as independent TI models. For the orthorhombic case, three TI model can be generated advantageously by selecting one azimuthal section of the data, and three different ranges of the azimuthal angle φ. For each range of φ the two step scanning process yields one optimum value for a moveout velocity and one for an anisotropic parameter, which suffices to reconstruct the orthorhombic medium. The common azimuthal section is defined by the receiver positions, the azimuthal angle φ describes the direction of the wavefront propagation.

Alternatively one fixed range of the azimuthal angle φ can be used, said range may extend to all possible values of φ, together with three different sections of data with common azimuth.

As another alternative, a combination of the two methods described before can be used to determine the optimal value of the moveout velocities and the anisotropic parameters of the medium. This combination is used in the following example, where the scanning process is repeated over different pairs of common azimuthal section and azimuthal angle. The steps are:

(i) Selecting a zero degree azimuthal section and limit the linearized inversion to near zero degree azimuthal angle. Applying the two scanning step procedure to reconstruct a TI velocity model which is described in equation [15]. The orthorhombic parameters thereby determined are the normal moveout velocity $V_{x,NMO}$ and the anelliptic parameter $\rho_5$.

(ii) Selecting a 90 degree azimuthal section and limit the linearized inversion to near 90 degree azimuthal angle. Applying the two scanning step procedure to reconstruct a TI velocity model which is described in equation [17]. The orthorhombic parameters recovered here are the normal moveout velocity $V_{y,NMO}$ and the anelliptic parameter $\rho_6$.

(iii) Selecting a 45 degree azimuthal section and limit the linearized inversion to near 45 degree azimuthal angle. applying two scanning step procedure to reconstruct a TI velocity model which is described in equation [16]. There is only one new orthorhombic parameter to be reconstructed here, the anelliptic parameter $\rho_4$, because the normal moveout velocity in this common azimuthal section is the arithmetic average of the elliptic normal moveout velocities $V_{x,NMO}$ and $V_{y,NMO}$.

Alternatively, zero degree azimuthal section or 90 degree azimuthal section without limitation on azimuthal angles can be used to adjust for the anelliptic parameter $\rho_4$. The full orthorhombic dispersion [9] must be used in the linearized inversion. This alternative removes the need for a third common azimuthal $V_{x,NMO}$, $V_{y,NMO}$, $\rho_4$ and $\rho_4$ through steps (i) and (ii).

In the following the above steps are carried out using a a geological model shown in FIG. 3. The medium is composed of homogeneous orthorhombic anisotropic material overlying an isotropic material. The interface between the two materials is invariant with respect to the y-axis. The elastic coefficients of this orthorhombic material are (using the density normalized stiffness tensor a{ijpq} in its compact notation A{IJ}) A{11}=12.79, A{22}=11.32, A{33}=8.56, A{12}=5.47, A{13}=5.14, A{23}=4.88, A{44}=2.30, A{55}=2.58, A{66}=2.76, $V_v$=2.93, $V_{x,NMO}$=3.47, $V_{y,NMO}$=3.22, $\rho_4$=−0.27, $\rho_5$=0.0877, $\rho_6$=0.107 and by FIGS. 1A and 1B, where use was made of the same medium. The A{IJ} are expressed in (km/s)$^2$ and the velocities in km/s; the anisotropy parameters are dimensionless.

Two common azimuthal sections, zero degree azimuthal section and 90 degree azimuthal section, were computed. The zero degree azimuthal section was formed as D($k_x$, $k_y$, $\omega$; $k_h$, $k_h'$=0) and 90 degree azimuthal section is formed as D($k_x$, $k_y$, $\omega$; $k_h$=0, $k_h'$). For each common azimuthal section, 198 gathers corresponding to midpoints spaced every 12 m, with offset coverage between 100 m to 5000 m were computed using the Born forward modeling described by L. Ikelle, Geophys.J.Int., No. 123(1995), 507–528 with the exact vertical wavenumbers computed using the eigenvalue-eigenvector system.

As stated above (step (i)) the process of background reconstruction is started with the zero degree azimuthal section. The inversion is limited to zero degree azimuthal angle. $V_{x,NMO}$ is determined firstly by a scan over isotropic velocity models and then the anelliptic parameter $\rho_5$ is optimized by a second scan. The scan over velocities is carried out for velocities between 2900 m/s and 3700 m/s with an increment of 100 m/s. The inverted parameter is the P-wave impedance. Applying the amplitude criteria to determine, an optimum velocity of 3500 m/s is established. The second scan is carried out over different values of anellipticity with $V_{x,NMO}$=3500 m/s. The anellipticity is varied from −0.1 to 0.3 with an increment of 0.05. The best value for $\rho_5$ is between 0.05 and 0.1. The mean 0.075 again is in good agreement with the actual value (0.0877).

Then selecting the 90 degree azimuthal data. The inversion is limited to 90 degree azimuthal angle. Firstly, $V_{y,NMO}$ is determined by a scan over isotropic velocity models and subsequently the anelliptic parameter $\rho_6$ by a second scan. As result, the velocity could be determined as 3100 m/s or 3200 m/s, slightly below the actual value of 3220 m/s. This small discrepancy is due to missing small offsets. In fact, by working with a 90 degree azimuthal data restricted only to 90 degree azimuthal angle, and invariant with respect to the y-axis, the medium is inverted only at $k_x$=$k_y$=0, which equivalent to a one dimensional model. The missing near offsets have greater effect on the estimation of the normal moveout velocity when the medium is one dimensional.

The second scan is carried out over different values of anellipticity with $V_{y,NMO}$=3200 m/s. The anellipticity varies from −0.1 to 0.3 with an increment of 0.05. The best value of $\rho_6$ is 0.10 which is the closest to the actual value for increments of 0.05.

To completely reconstruct the orthorhombic background velocity, the anelliptic parameter $\rho_4$ is determined. Using the 90 degree azimuthal data D($k_x$, $k_y$, $\omega$; $k_h$=0, $k_h'$) without restriction on azimuthal angles and using the full orthorhombic dispersion, a final scan is carried out over different values of the anelliptic parameter $\rho_4$. The values are taken between −0.2 and 0.2 with an increment of 0.05 while the moveout velocities are fixed to 3500 m/s and 3200 m/s, and the anelliptic parameters $\rho_5$ and $\rho_6$ are fixed to 0.75 and 0.10, respectively. The optimal value is determined as being −0.05, again very close to the actual value −0.027.

Significant improvement in the imaging of dipping reflectors after correcting for the anellipticity is observed.

I claim:

1. A 3-D seismic surveying method for surveying a subsurface earth formation comprising the steps:
   defining at least one moveout velocity and at least one anisotropy parameter; and
   inverting recorded 3-D seismic data using a plurality of different values for said velocity and said anisotropy parameter in order to generate an optimized representation of said earth formation.

2. The method of claim 1, comprising the step of determining a relation characterizing the movement of the wavefront of an elastic wave in time and space, said relation including the anisotropic parameter, and using said relation in the data inverting step.

3. The method of claim 1, wherein an optimal representation is determined by using a criterion chosen from a group consisting of amplitude criteria, focusing criteria, coherence criteria, and bicoherence criteria.

4. The method of claim 1, wherein the recorded data are prestack data.

5. The method of claim 1, comprising the step of determining the representation of the earth formation by decomposing said representation into essentially independent representations of transversely isotropic media, each of said media having one velocity and one anisotropic parameter.

6. The method of claim 1, further including the step of arranging the seismic data into common azimuthal section.

7. The method of claim 1, wherein the inversion is performed over a limited range of the azimuthal angle.

8. The method of claim 1, wherein the number of anisotropy parameters is less than 6.

9. The method of claim 1, wherein the at least one anisotropy parameter is dimensionless.

10. The method of claim 1 including the step of acquiring seismic data using means for generating waves travelling through subterranean formations and means to record said waves.

\* \* \* \* \*